455-601 AU 233 EX CROSS REFERENCE EXAMINER
FIP8106 XR 2,515,263

July 18, 1950 P. RAIBOURN 2,515,263

COMMUNICATION SYSTEM

Filed Feb. 24, 1944 2 Sheets-Sheet 1

INVENTOR
PAUL RAIBOURN
BY Darby & Darby
ATTORNEY

July 18, 1950 P. RAIBOURN 2,515,263

COMMUNICATION SYSTEM

Filed Feb. 24, 1944 2 Sheets-Sheet 2

INVENTOR
PAUL RAIBOURN
BY Darby & Darby
ATTORNEY

UNITED STATES PATENT OFFICE 2,515,263

COMMUNICATION SYSTEM

Paul Raibourn, Southport, Conn.

Application February 24, 1944, Serial No. 523,683

6 Claims. (Cl. 250—7)

Figures 1, 2:
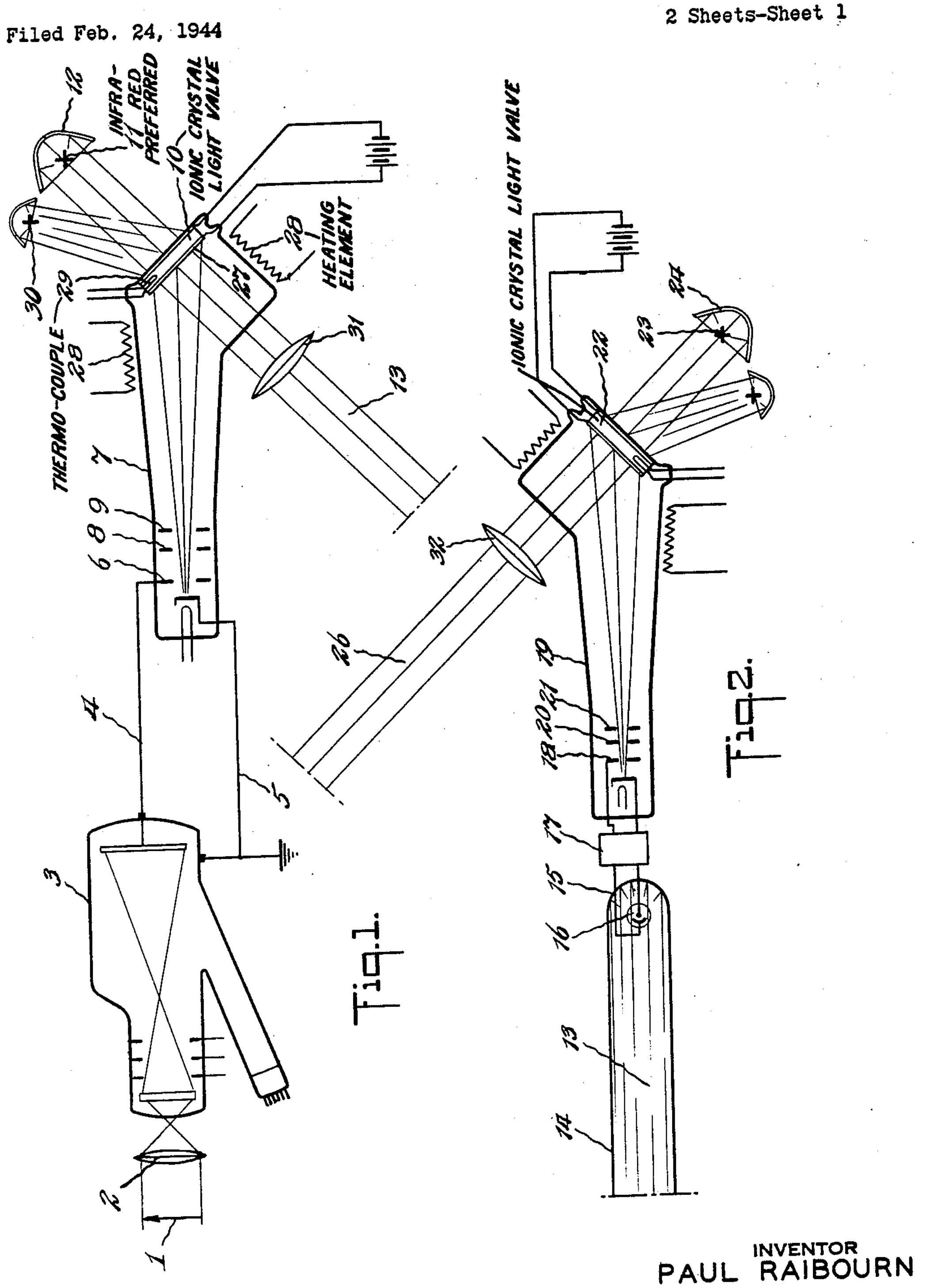

This invention relates to a system for picking up a signal to be transmitted, such as a radio program or television scene, and transmitting it to a central broadcast station where it is to be broadcast. This system may also be used as a relay system for picking up a program originating at one point and relaying it to another point. For example, a television broadcasting station might be located in New York and a station in accordance with my invention located at each of several points between New York and another city, and the program relayed to the second city. It may also be used to carry telephone and telegraph messages, or for picture transmission, or simply for direct communication.

A feature of my invention is that the signal to be transmitted is carried upon a visible or invisible light beam which may have impressed thereon a wide band of modulation, so that a television program, or many individual radio sound programs, may be transmitted on a single beam.

A feature of my invention is that it provides a pick-up or relay system which is economical, efficient and highly faithful.

My invention involves the use of ionic crystals, many of which have the property of becoming opaque to some degree to light of certain wave lengths if their theoretically uniform crystalline structure (and accompanying inter-ion electrical fields) is disturbed by the presence of electrons in certain positions other than the electronic orbits normal to the theoretically uniform crystalline structure. This condition of strain can be increased or caused by bombardment with X-rays, ultra-violet rays, cathode rays, or electron streams, certain positive ions, or any phenomenon aiding the escape from or capture of electrons by ions in the crystal. The electrons causing the absorption band can be moved within the crystal by the application of electrical fields.

Of these ionic crystals, the alkali halides with their simple cubic structure, are particularly sensitive to such effects and their absorption bands are found in the region of visible light or the near infra-red.

Figure 3:
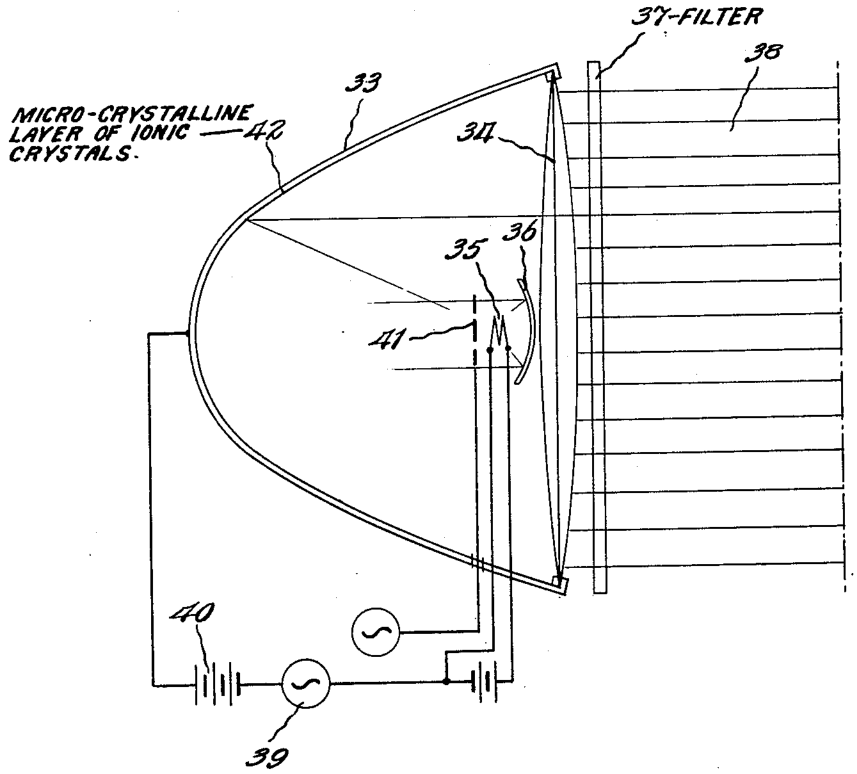

Such crystals and their properties are described in a book entitled "Electron Processes in Ionic Crystals" by N. W. Mott and R. W. Gurney, published by the Oxford University Press in 1940. Such ionic crystals are also described in United States patent to A. H. Rosenthal No. 2,330,171, issued September 21, 1943, and in the I. R. E. proceedings for May 1940, pages 203 to 212, In the drawings, Figure 1 is a schematic diagram illustrating one preferred exemplification of my invention as a pick up system for television signals;

Figure 2 is a schematic diagram illustrating the use of my invention as a relay station for repeating signals; and Figure 3 is a schematic diagram illustrating another exemplification.

In Figure 1, the arrow 1 indicates a television scene which is to be picked up. A lens 2 focuses the scene upon a television scanning system which is illustrated as an image pick-up or television camera tube 3. Such an image pick-up or television camera tube is disclosed on page 109 of "Principles of Television Engineering," by Donald G. Fink, published by the McGraw-Hill Book Co., New York, in 1940. The electrical impulses corresponding to the television scene appear upon the leads 4, 5 in the usual manner. These signals are impressed upon the signal grid 6 of a cathode ray tube 7. The cathode ray tube has anodes 8, 9 which disperse the rays so that the radiant beam impinges against the full surface of an ionic crystal 10 in the other end of the tube. This is defined in this invention as impressing the beam simultaneously upon a large portion of a crystal to distinguish such a dispersed beam from one which scans successive discrete areas of a crystal. This may be either a single ionic crystal or a sublimed, deposited, or evaporated microcrystalline layer of varying thickness as desired, or a microcrystalline layer suspended in a medium transparent to the wave lengths for which the crystal becomes opaque under electronic action and with the same or a selected different index of refraction as the crystal. It might even be a glass, which is a super cooled structure which has solidified before the molecules were fully oriented into a crystalline structure. In the claims all are included within the term "ionic crystal." A source of light 11, which is preferably in the near infra-red, is focused by a parabolic reflector 12 upon the ionic crystal 10 and lens 31 (to maintain the beam parallel) and directed toward the next station where the signals are to be picked up, such as the station illustrated in Figure 2. The modulated light beam projected toward the next station is indicated by the lines 13.

The ionic crystal 10 will be given a restoring time in accordance with the characteristics desired as regards degree of modulation and band width to be transmitted. This can be accomplished in several ways. Shown diagrammatically is a transparent conducting electrode 27 of high positive voltage, a heating element 28 surrounding the crystal and the thermocouple 29 for automatic temperature regulation and a source 30 of infra-red light having a wave length of such a length as to increase the natural amplitude of vibration of the ions in the lattice. This latter source may also be the light 11 which may also be so situated as to be the source of heat focused on crystal 10. All of these elements can be used to increase the speed of disappearance of the opacity effect. On the other hand, many selected impurities, notably some of the light metals, also tend to control the disappearance of the opacity effect. The restoration time may also be controlled within close limits by the use of an arrangement of electrodes and voltages thereon varying with time so arranged as to control the movement of electrons into and out of the crystal as opacity is desired, and so arranged as to minimize electrolytic action. These elements, together with the strength of the radiant beam can be so balanced as to produce the restoration time desired. The crystal will, therefore, have a degree of transparency at every instant corresponding accurately and faithfully with the modulations impressed upon the grid 6 which in turn correspond faithfully to the television signals to be broadcast. Thus the modulated light beam 13 will carry the television signal.

Any ions evolved from the crystal due to heating or bombardment as indicated may be controlled by the use of a suitable getter inside the tube.

An ionic crystal operated in this manner may carry a wide band of modulation. It is thus possible to transmit several television programs simultaneously by such a modulated light beam in accordance with my invention, the different programs, of course, being separated by being impressed upon different carrier frequencies.

In Figure 2 I have illustrated a relay station for use in accordance with my invention. In that figure a long tube 14 is directed toward the light beam 13 from the station whose signals are to be picked up. The incoming modulated light beam 13 of Figure 1 is again illustrated as 13 of Figure 2. The incoming modulated light beam strikes a parabolic reflector 15 in the end of the tube 14 and is reflected upon a photo-electric cell 16 where the light is translated into electrical impulses. These electrical impulses may be amplified in the amplifier 17 and again impressed upon the grid 18 of a cathode ray tube 19 having anodes 20 and 21 which disperse the beam so that it covers the entire surface of an ionic crystal 22. A source of infra-red light 23 at the relay station is reflected by a parabolic reflector 24 upon the ionic crystal 22 and produces a modulated light beam 26 which is directed through the lens 32 toward the station where it is to be picked up.

In Figure 3 there is illustrated a modification of my invention which may be substituted for the appropriate parts of Figure 1 or Figure 2.

In Figure 3, I show an evacuated container having a parabolic reflecting surface 33 enclosed by a lens 34. Within the container is a filament 35 producing infra-red light. The radiant beam from filament 35 is reflected upon the parabolic surface by the reflector 36. Upon the parabolic surface is a microcrystalline layer of ionic crystals 42. A filter 37 filters the light beam 38 which is projected toward a receiving station.

In this case the source of electrons, the light beam, and the infra-red are all replaced by the filament 35. The modulation voltage may be applied at 39 between the reflector and the electron source, superposed on the restoration control voltage 40, or the modulating voltage may be applied to a grid 41 within the container to control the electron stream.

With the use of my invention a television program may originate, for example, in Madison Square Garden and the television signals may be conveyed to the roof of that building where they are impressed upon a cathode ray tube having therein an ionic crystal constructed in accordance with the tube 7 of Figure 1. They may there be caused to energize an ionic crystal 10 to modulate a light beam 11 and be transmitted along the beam of light to a receiving station. This receiving station may be located at a high point such, for example, as the top of the Empire State Building where one or more relay stations such as those shown in Figure 2 may relay the signals along one or more additional beams of light directed to strategic points throughout the city of New York. At these strategic points additional repeating stations may be located where the signals may be repeated in accordance with the apparatus in Figure 2 and directed toward each moving picture theatre in the city where they may be picked up with apparatus like that illustrated by reference numerals 14, 15 and 16 of Figure 2, conveyed down into the theatre and used to reproduce the television scene upon the theatre screen.

It will be obvious that my invention has many applications. It may be used for example for direct signalling of a single telephone or other message between a transmitting and a receiving station. It is particularly useful for such signalling for war purposes such as signalling between an airplane and the ground or between ships at sea. For signalling between ships at sea at night it will be clear that my system may be used without showing any visible light so that the presence of the ships will not be revealed to any enemy ships lurking in the vicinity. Thus the officer in charge of a large fleet may be in constant communication with all ships under his command even though some of them may be over the horizon by simply repeating the signals from ship to ship with stations within line of sight of one another. Or the fleet may actually maintain radio silence and still be in communication with its base by simply having a line of ships within sight of one another from the location of the fleet back to the base.

I do not desire to be restricted to the specific disclosure hereof but only within the scope of this invention.

What is claimed is:

1. A signal transmission and relay system comprising a source of signals, means for converting said signals into electric impulses, a radiant beam, means for modulating said beam with said signals, an ionic crystal, said crystal being positioned in the path of said beam to receive continuously all signal modulations thereof, means for impressing said modulated beam simultaneously upon a large portion of the entire area of said ionic crystal, a source of light, and means for directing a beam of light from said source upon said ionic crystal, said crystal intercepting substantially all of said beam of light.

2. A relay station comprising means for intercepting a modulated beam of light, a photo-sensitive device, means for impressing said modulated beam of light upon said photo-sensitive device, means for producing a radiant beam, means for modulating said beam with electrical impulses from said photo-sensitive device, an ionic crystal, said crystal being positioned in the path of said beam to receive continuously all signal modulations thereof, means for directing said modulated radiant beam upon said ionic crystal, a source of light, and means for projecting a beam of light from said source upon said ionic crystal, said crystal intercepting substantially all of said beam of light.

3. A signalling system comprising a reflecting surface, and ionic crystal upon said surface, a radiant beam comprising emitted electrons and radiated light, means for modulating said radiant beam with signal modulations, and means for impressing said beam upon said ionic crystal substantially the entire area of said ionic crystal being positioned in the path of said electrons to receive continuously all signal modulations thereof and substantially all of said crystal and reflecting surface being intercepted by said light.

4. A television transmission and relay system comprising an electron tube having an electron stream modulated by a signal, an ionic crystal positioned in the path of said stream to receive continuously all signal modulations thereof, said stream being simultaneously impressed upon substantially the entire area of said crystal, a light source generating a beam of light directed on said crystal to modulate said beam in accordance with the modulations of said electron stream, said crystal intercepting substantially all of said beam of light.

5. A television transmission and relay system comprising a television camera tube connected to modulate the beam from a source of electrical energy, an ionic crystal positioned in the path of said beam of electrical energy to receive continuously all signal modulations thereof, a source of light directing a beam on said crystal to modulate said light in accordance with the modulations of said beam of electrical energy, said crystal intercepting substantially all of said light beam.

6. The method of transmitting signals which comprises generating a beam of electrical energy, modulating said beam with a signal, directing said modulated beam on an ionic crystal to continuously impress all modulations on said crystal on substantially the entire area thereof, generating a beam of light and intercepting said beam of light with said crystal to modulate said beam of light in accordance with the modulations of said beam of electrical energy.

PAUL RAIBOURN.

REFERENCES CITED

The following references are of record in the file of this patent:

UNITED STATES PATENTS

| Number | Name | Date |
|---|---|---|
| 1,976,120 | Francis | Oct. 9, 1934 |
| 2,100,348 | Nicolson | Nov. 30, 1937 |
| 2,187,908 | McCreary | Jan. 23, 1940 |
| 2,277,007 | Von Ardenne | Mar. 17, 1942 |
| 2,293,899 | Hanson | Aug. 25, 1942 |
| 2,330,171 | Rosenthal | Sept. 31, 1943 |
| 2,335,659 | Fraenckel et al. | Nov. 30, 1943 |
| 2,351,889 | Strubig | June 30, 1944 |
| 2,366,319 | Donal, Jr. | Jan. 2, 1945 |

FOREIGN PATENTS

| Number | Country | Date |
|---|---|---|
| 5434/27 | Australia | May 31, 1927 |
| 451,854 | Great Britain | Aug. 12, 1936 |